(12) United States Patent  
McCullough et al.

(10) Patent No.: US 9,413,194 B2  
(45) Date of Patent: Aug. 9, 2016

(54) EMERGENCY LIGHTING SYSTEM

(71) Applicants: Lon W McCullough, San Jose, CA (US); Luna J Anthony, San Jose, CA (US)

(72) Inventors: Lon W McCullough, San Jose, CA (US); Luna J Anthony, San Jose, CA (US)

( * ) Notice: Subject to any disclaimer, the term of this patent is extended or adjusted under 35 U.S.C. 154(b) by 162 days.

(21) Appl. No.: 13/686,514

(22) Filed: Nov. 27, 2012

(65) Prior Publication Data

US 2014/0145623 A1    May 29, 2014

(51) Int. Cl.

| | |
|---|---|
| G08B 3/10 | (2006.01) |
| H05B 37/02 | (2006.01) |
| H02J 9/02 | (2006.01) |
| G08B 5/36 | (2006.01) |
| G08B 5/38 | (2006.01) |
| G08B 17/00 | (2006.01) |

(52) U.S. Cl.  
CPC ... *H02J 9/02* (2013.01); *G08B 5/36* (2013.01); *G08B 5/38* (2013.01); *G08B 17/00* (2013.01)

(58) Field of Classification Search  
CPC combination set(s) only.  
See application file for complete search history.

(56) References Cited

U.S. PATENT DOCUMENTS

| | | | | |
|---|---|---|---|---|
| 7,236,097 | B1* | 6/2007 | Cunningham | 340/692 |
| 7,677,753 | B1* | 3/2010 | Wills | 362/161 |
| 2001/0038336 | A1* | 11/2001 | Acevedo | 340/628 |
| 2005/0057353 | A1* | 3/2005 | Barrieau et al. | 340/506 |
| 2005/0104724 | A1* | 5/2005 | Faltesek | 340/511 |
| 2007/0176766 | A1* | 8/2007 | Cheng | 340/527 |
| 2009/0278479 | A1* | 11/2009 | Platner et al. | 315/312 |
| 2010/0102960 | A1* | 4/2010 | Simon et al. | 340/540 |
| 2010/0123570 | A1* | 5/2010 | Antonopoulos et al. | 340/501 |
| 2012/0262069 | A1* | 10/2012 | Reed | 315/130 |

\* cited by examiner

*Primary Examiner* — Brian Zimmerman  
*Assistant Examiner* — Cal Eustaquio  
(74) *Attorney, Agent, or Firm* — Ariel S. Bentolila; Bay Area IP Group LLC

(57) ABSTRACT

An emergency lighting system initiated by the wireless or wired alarm signal of a smoke detector or other alarm device. Once the alarm signal has been received the emergency lighting system will cause any light connected to the system to either be turned on providing light for any persons present, or alternatively, the emergency lighting system will pulse the light as a visual warning indicator to those present. The lighting system causes connected light(s) to pulse during a daytime light condition or when there is sufficient ambient light in the room. At night, or when the room is dark, the lighting system will turn on the light(s) to provide light for any persons present; lighting the area for a safer egress out of the building. The emergency lighting system is a device that can be installed in a light bulb socket or built in to a wall plate light switch. Also, the emergency lighting system could be built in to lighting fixtures by a manufacturer.

18 Claims, 14 Drawing Sheets

NC = NORMALY CLOSED
R-1 = RELAY ONE  SPST
R-2 = RELAY TWO  SPST
R-3 = RELAY THREE  DPST
R-4 = RELAY 4  SPST
R-4 = RELAY FOUR  SPST
⊙ = LIGHT
⌒⌒ = RELAY COIL
⌒o = MANUAL SWITCH

WIRELESS RECEIVER AND TRANSMITTER WITH NORMALLY OPEN CONTACTS

SMOKE DETECTOR WITH WIRELESS TRANSMITTER

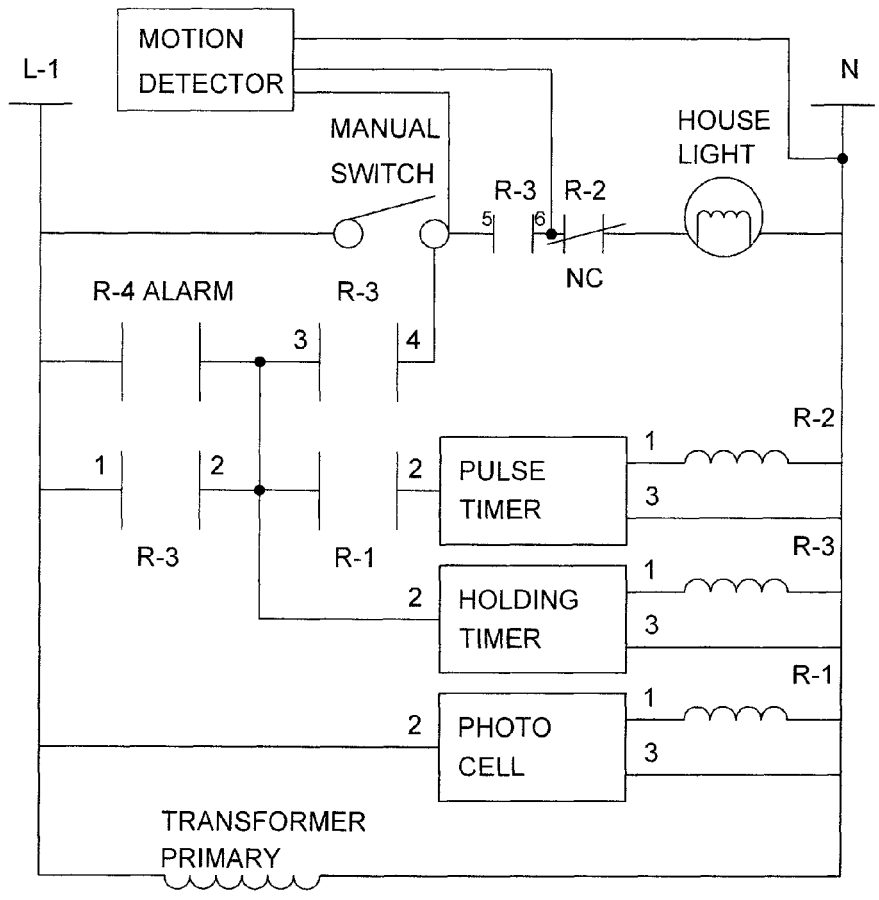
FIG 6
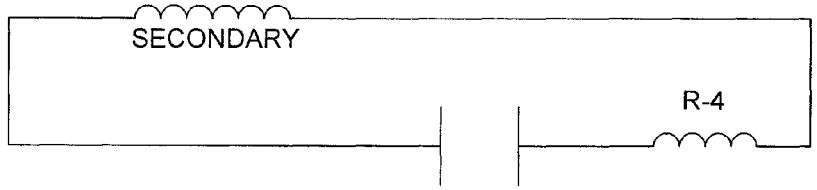
NC = NORMALY CLOSED
R-1 = RELAY ONE  SPST
R-2 = RELAY TWO  SPST
R-3 = RELAY THREE  DPST
R-4 = RELAY 4  SPST
R-4 = RELAY FOUR  SPST
◯ = LIGHT
⌒⌒ = RELAY COIL
⌒₀ = MANUAL SWITCH
WIRELESS RECEIVER AND TRANSMITTER WITH NORMALLY OPEN CONTACTS
SMOKE DETECTOR WITH WIRELESS TRANSMITTER NC = NORMALY CLOSED
R-1 = RELAY ONE  SPST
R-2 = RELAY TWO  SPST
R-3 = RELAY THREE  DPST
R-4 = RELAY FOUR  SPST
⊚ = LIGHT
⌒⌒ = RELAY COIL
◠╱◠ = MANUAL SWITCH

OS = OCCUPANCY SENSOR
MS = MANUAL SWITCH
LOAD = LIGHT

SCREW IN INSERTION

DRAWN WITH HARD
WIRE OPTION POINT

LINE OR LOAD POINT
OF CONTACT

EMERGENCY LIGHTING SYSTEM

FIELD OF THE INVENTION

The present invention generally pertains to emergency lighting systems, more particularly the invention pertains to emergency lighting systems that are activated via wireless or wired alarm signal, and even more particularly to emergency lighting systems that incorporate on/off switches or motion detectors for everyday use and yet function as emergency lighting systems upon entering a state of alarm.

BACKGROUND OF THE INVENTION

Emergency lighting systems come in many sizes and shapes. Typically they are a system of lights that work to provide light during an emergency. These systems can be designed and installed to lead people to exit locations so they can leave a building during a time of emergency. Emergency lighting systems also tend to be costly to purchase and can be difficult to install in pre-existing buildings. Mostly emergency lights and lighting systems are used solely for emergency purposes and simply sit there waiting to be used the balance of the time.

Therefore, there is a need in the art, for an emergency lighting system that can be used as an everyday light, one that is easily installed in an a light fixture or can be put in place of existing wall switch plate, is readily usable in a variety of locations and conditions, and which benefits occupants by illuminating and or warning them of an emergency in the building.

SUMMARY OF THE INVENTION

The present invention provides an emergency lighting system that is activated via wire or wireless alarm signal from a smoke detector or other alarm device. It provides light or visual warning to persons present to either light their surroundings for safer egress or warn that an emergency may exist. It is easy to install and easy to use. It is suited for use in existing buildings or can be built into new construction.

The emergency lighting system consists of individual devices that control at least one connected light. The individual devices will also work together by transmitting their own alarm signals that then activate other emergency lighting system devices in the area. Thus each device works independently, as well as in concert in the case of multiple devices connected in the proximate area, to activate connected lights and provide illumination for warning or egress.

Each time an emergency lighting system device receives an alarm signal it will provide emergency light control as well as send out its own alarm signal to activate other emergency lighting system devices that may not have been reached by the original alarm signal transmission.

Another aspect of the present emergency lighting system is that it is also used to turn on and off connected lights as any normal light switch. Thus the emergency lighting system serves as normal light switch while at the same time providing the benefit of an emergency lighting system should an emergency arise and the system enter into a state of alarm.

BRIEF DESCRIPTION OF THE DRAWINGS

FIG. 6 is a schematic illustration showing the emergency lighting system working in conjunction with an external motion detector.

DETAILED DESCRIPTION

The present invention will now be described with reference to the figures provided. The figure numbering in this section corresponds to the figure numbering in the Brief Description of the Drawings.

Before the present invention is disclosed and described, it is to be understood that this innovation is not limited to specific devises, systems, or methodology which can vary; the terminology used herein is for the purpose of describing particular embodiments and is not intended to limiting.

Embodiments according to the present invention provide an emergency lighting system. In one embodiment the system is comprised of relays, timers, photo cells, transformers, manual switches, wireless transmitters and receivers, all of which are known in the art, and works in conjunction with a host fixture such as an incandescent or fluorescent fixtures which are known in the art.

Figure 9A:
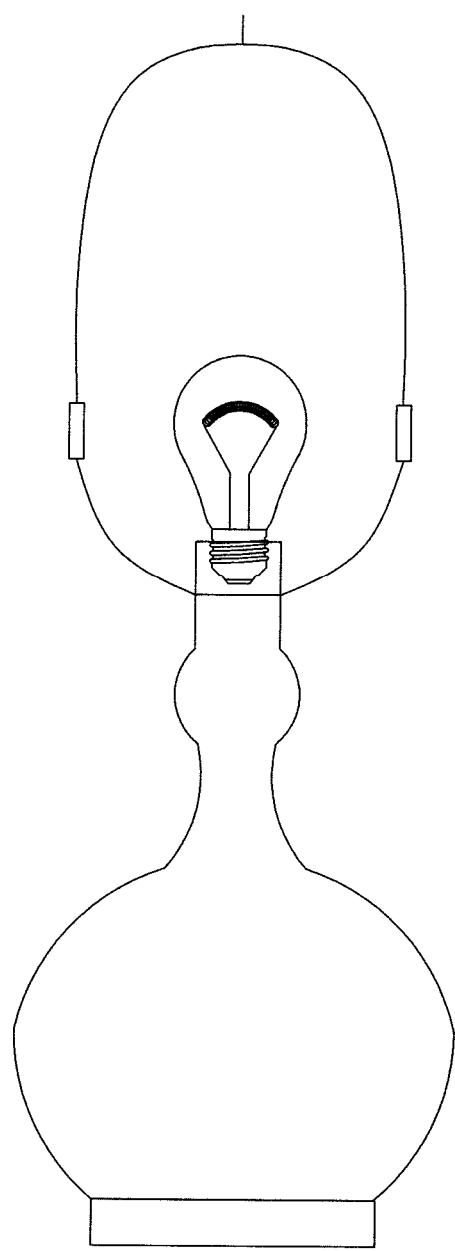
FIG. 9A is a partial perspective view of one embodiment of the emergency lighting system installed in a table lamp.
Figure 9:
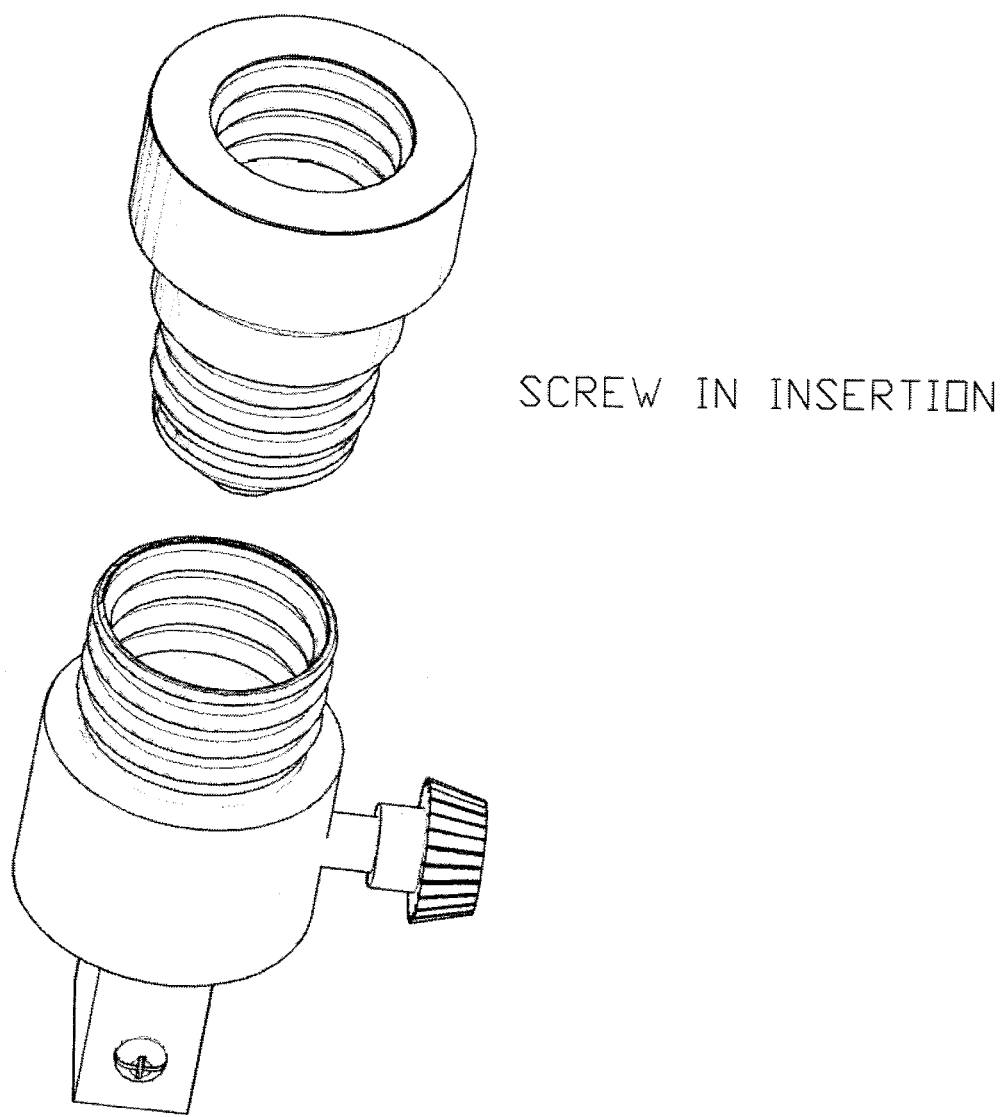
FIG. 9B is a partial perspective view of one embodiment of the emergency lighting system to be installed in an existing light fixture.

The embodiment of FIG. 9B is designed to be incorporated into a host fixture for an incandescent, fluorescent, or other bulb type lighting generally operating on alternating current (AC) electricity as the primary power source. FIG. 9B shows a medium screw base, as is commonly used in household applications, but can be resized to most any format including but not limited to intermediate screw, mogul screw, monopole and bi-pole prefocus bases, and other light bulb types.

Figure 1:
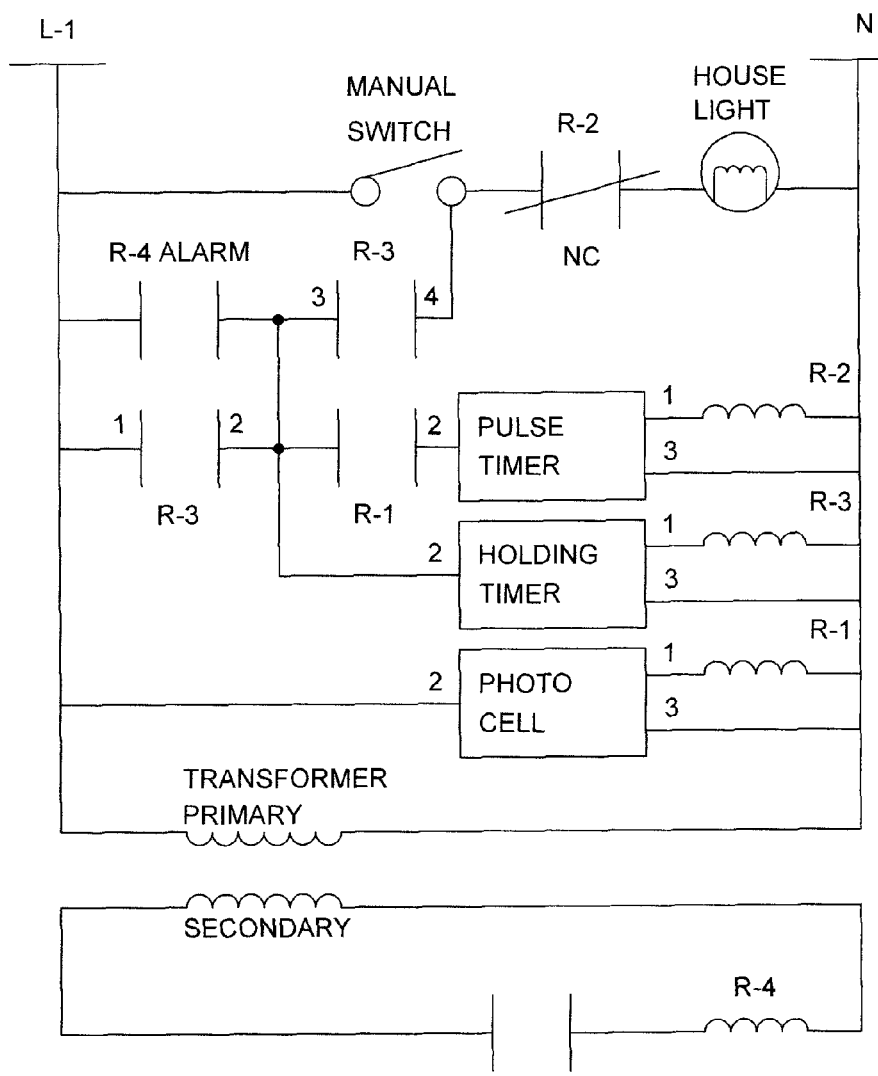
FIG. 1 is a schematic illustration showing the emergency lighting system in a light present, non-alarm condition.
Figure 2:
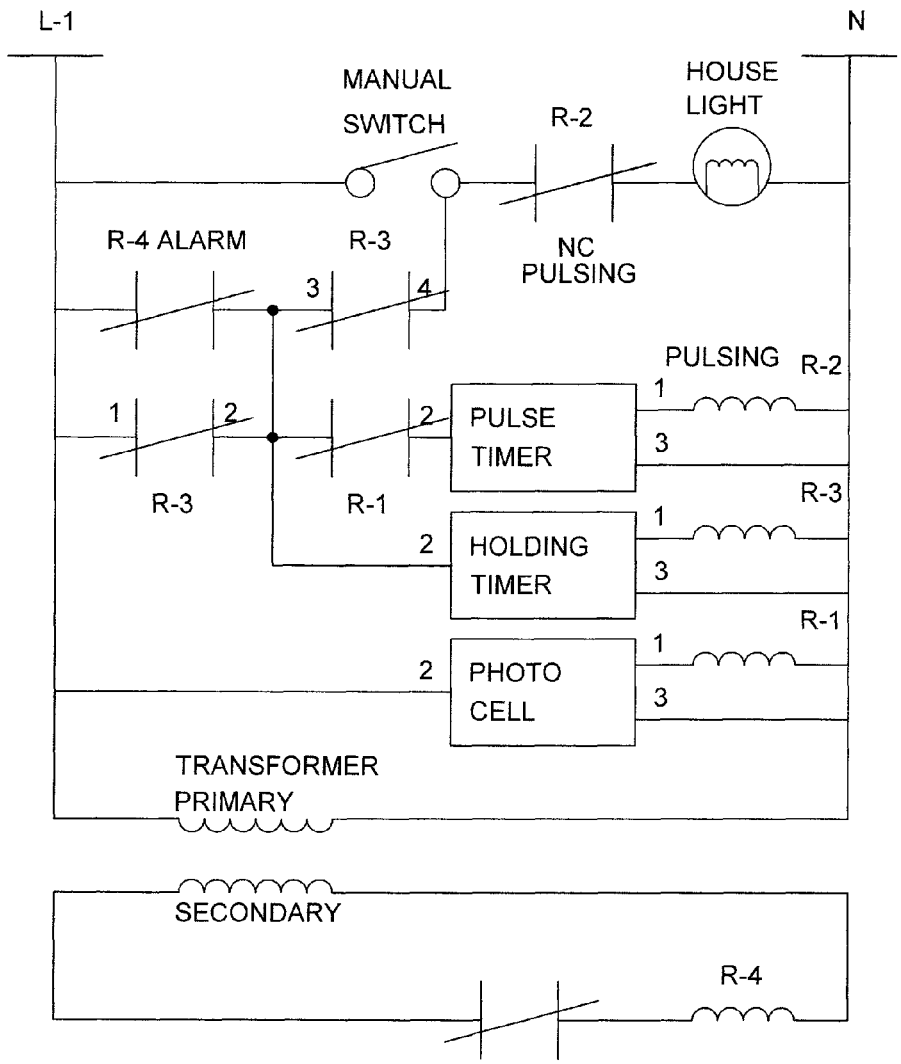
FIG. 2 is a schematic illustration showing the emergency lighting system in a light present condition, actively receiving an alarm signal.
Figure 3:
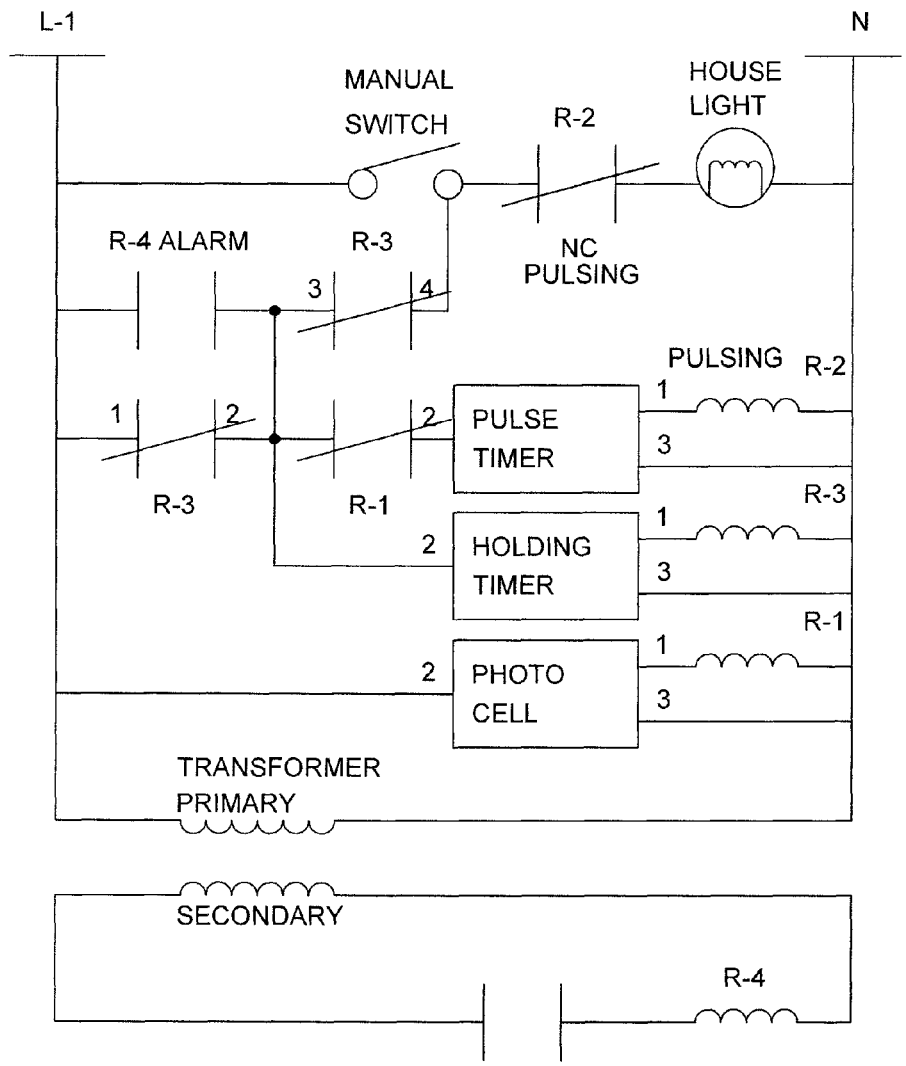
FIG. 3 is a schematic illustration showing the emergency lighting system in a light present condition, while not receiving an alarm signal, holding timer initiated.
Figure 4:
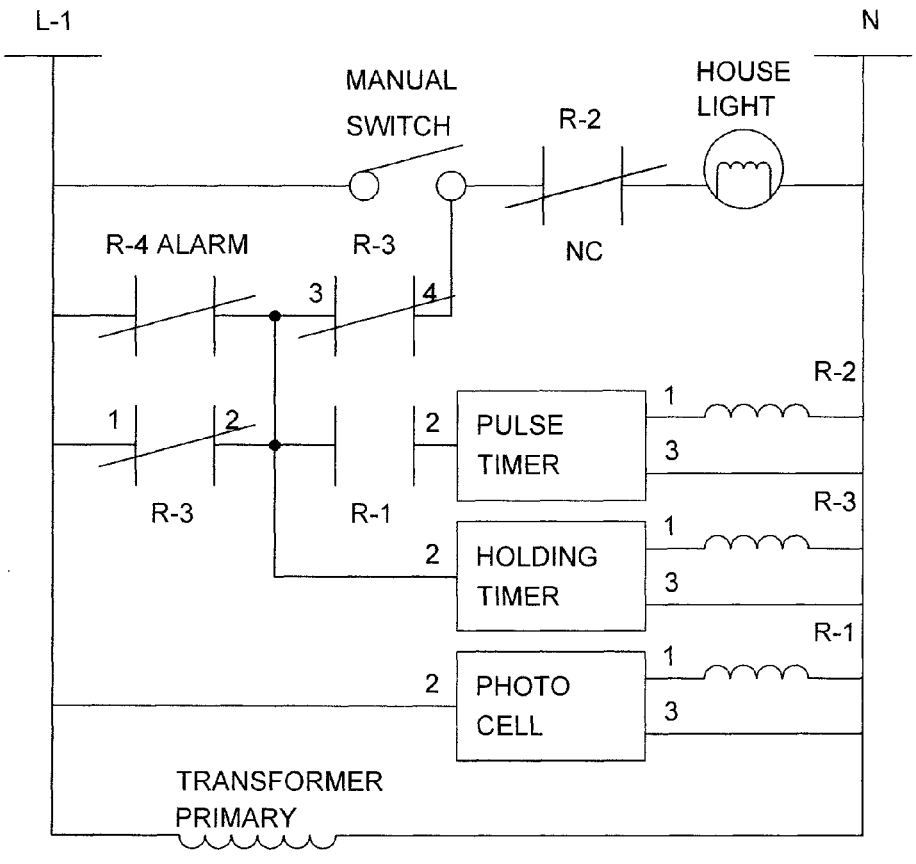
FIG. 4 is a schematic illustration showing the emergency lighting system in the absence of light, actively receiving an alarm signal.
Figure 4:
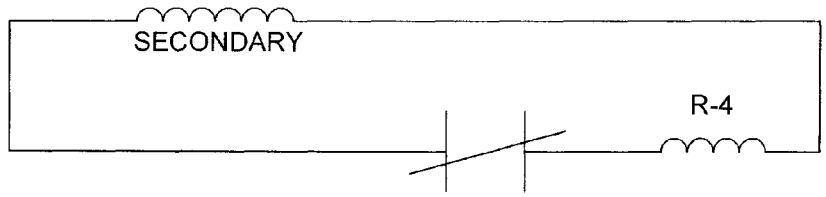
Figure 5:
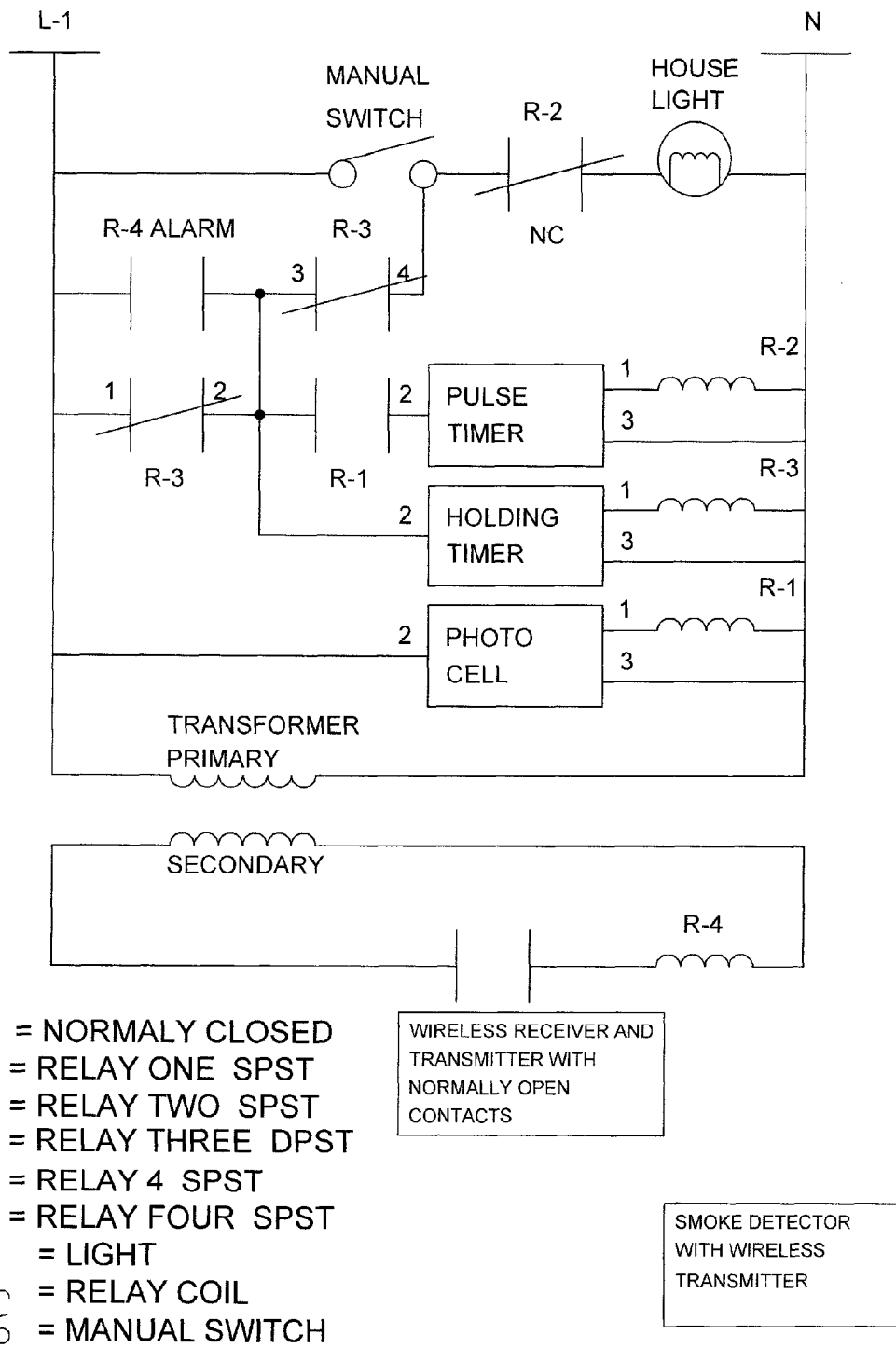
FIG. 5 is a schematic illustration showing the emergency lighting system in the absence of light, while not receiving an alarm signal, holding time initiated.

One embodiment of the present emergency lighting system is the housing assembly of FIG. 9B which encloses the FIG. 1 component design. In FIG. 1 a wireless receiver and transmitter with normally open contacts, as are well known in the art, is available to receive a wireless transmission from an external emergency or alarm transmitter, such as a smoke detector or other source. Receipt of an alarm signal closes the wireless receiver and transmitter's normally open contacts energizing the R-4 relay coil and closing the R-4 relay contacts. The now closed R-4 contacts establish power between terminals 2 and 1 of the holding timer. The activation of the holding timer provides power to the R-3 relay coil, closing the two normally open R-3 relay contacts. Thereafter, the holding timer will provide power to the R-3 relay coil for a specific amount of time even after the R-4 relay contacts revert to their normally open condition. The closure of the R-3 relay contacts allows continuity to the load side of the manual switch establishing continuity to the line side of the normally closed R-2 relay contacts and providing current to the attached light. Through the application of a photocell, a component known in the art, the R-1 relay coil will energize and close the R-1 relay contacts if the photocell detects sufficient ambient light. In the presence of sufficient ambient light the closed R-1 relay contacts provide continuity to an incorporated pulse timer, a device known in the art. Upon initiation the pulse timer energizes and de-energizes the R-2 relay coil; this in turn opens and closes the R-2 relay contacts pulsing an attached light.

Figure 10:
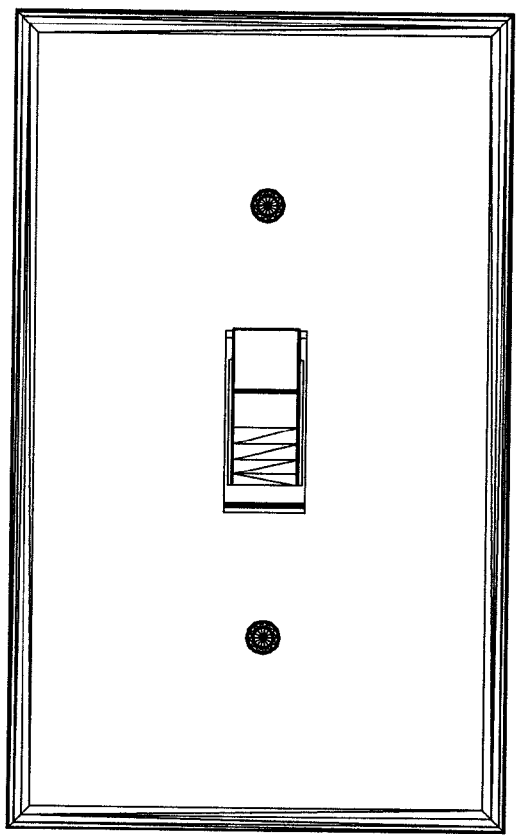
FIG. 10A is a partial perspective view of one embodiment of the emergency lighting system incorporating a wall light switch.
FIG. 10B is a partial perspective view of one embodiment of the emergency lighting system incorporating a wall light switch without the wall plate cover.
FIG. 10C is a partial perspective view of one embodiment of the emergency lighting system incorporating a wall light switch with an option point used to hardwire security systems or other external devices to the emergency lighting system.
Figure 10:
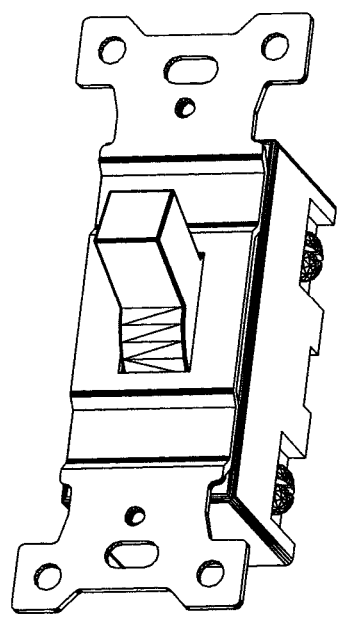
Figure 10:
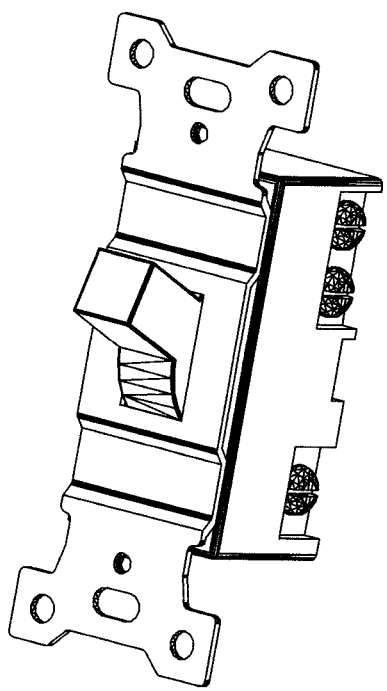

A second embodiment of the present invention is the component design of FIG. 6 which can be housed in the lamp conversion kit of FIG. 9B as well as the wall light switch of FIG. 10C. In FIG. 6 a wireless receiver and transmitter with normally open contacts, as are well known in the art, is available to receive a wireless transmission from an external emergency or alarm transmitter, such as a smoke detector or other source. Receipt of an alarm signal closes the wireless receiver and transmitter's normally open contacts energizing the R-4 relay coil and closing the R-4 relay contacts. The now closed R-4 contacts establish power between terminals 2 and 1 of the holding timer. The activation of the holding timer provides power to the R-3 relay coil, closing the three normally open R-3 relay contacts. The closure of the R-3 contacts, terminals 5 and 6, bypass an incorporated motion detector, a device well known in the art; this provides continuity through the normally closed R-2 contacts which allows voltage to pass to the attached light. Thereafter, the holding timer will provide power to the R-3 relay coil for a specific amount of time even after the R-4 relay contacts revert to their normally open condition. Through the application of a photocell, a component known in the an, the R-1 relay coil will energize and close the R-1 relay contacts if the photocell detects sufficient ambient light. In the presence of sufficient ambient light the closed R-1 relay contacts provide continuity to an incorporated pulse timer, a device known in the art. Upon initiation, the pulse timer energizes and de-energizes the R-2 relay coil; this in turn opens and closes the R-2 relay contacts pulsing an attached light.

Figure 7:
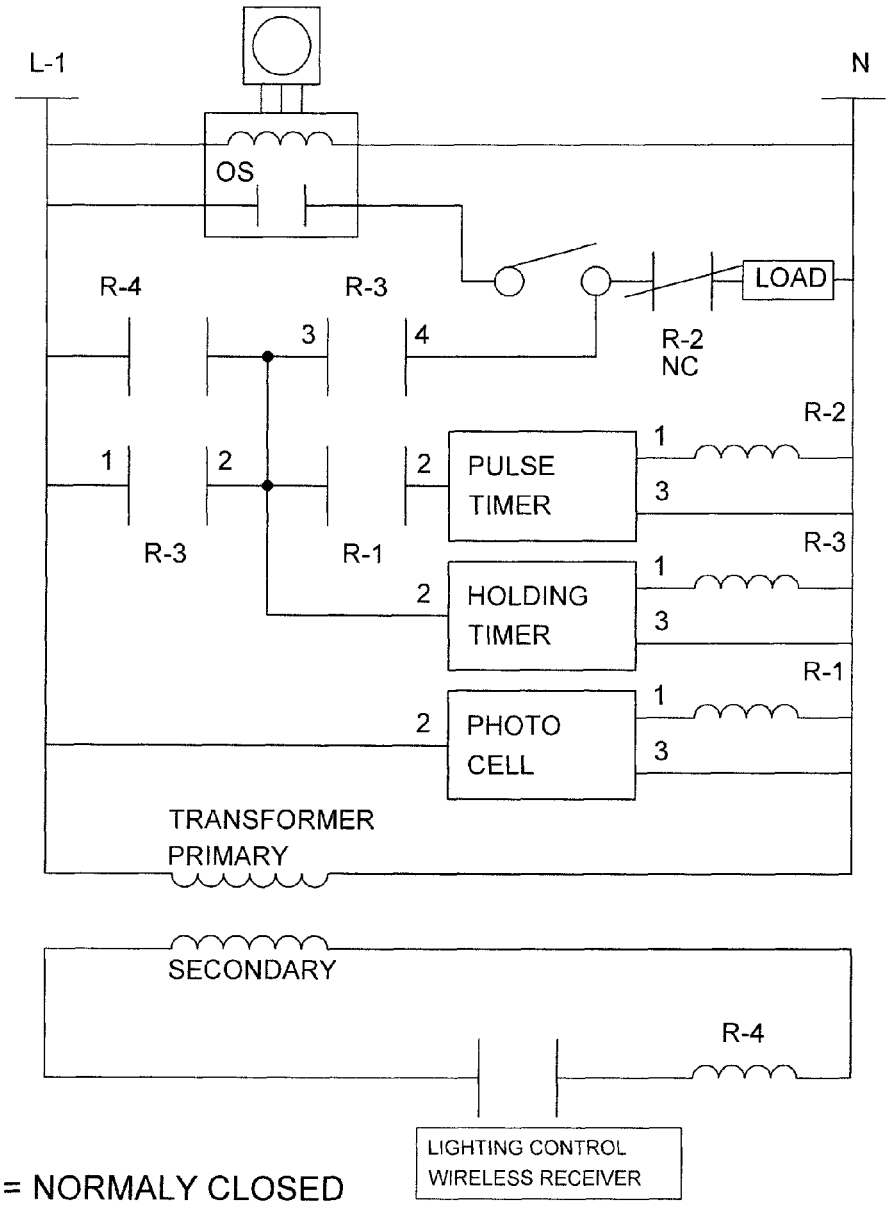
FIG. 7 is a schematic illustration showing the emergency lighting system working in conjunction with an ultrasonic occupancy sensor.
Figure 8:
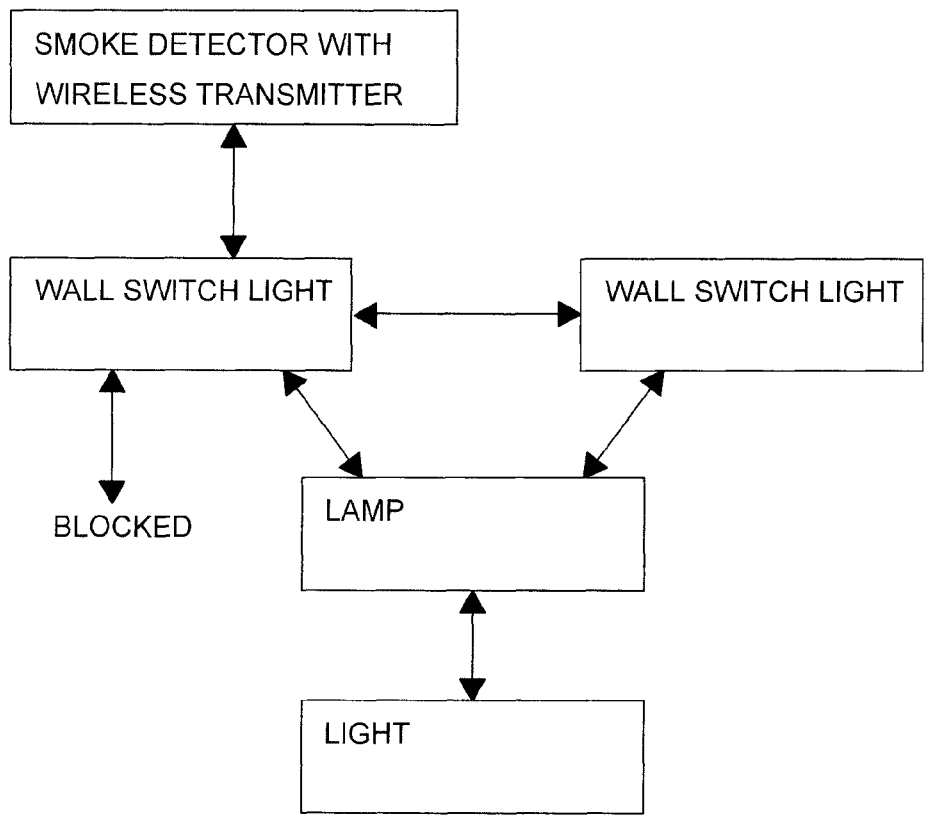
FIG. 8 is a partial front elevation view of a floor plan employing the emergency lighting system and illustrating the device interconnectivity via wireless transmitter.
Figure 8:
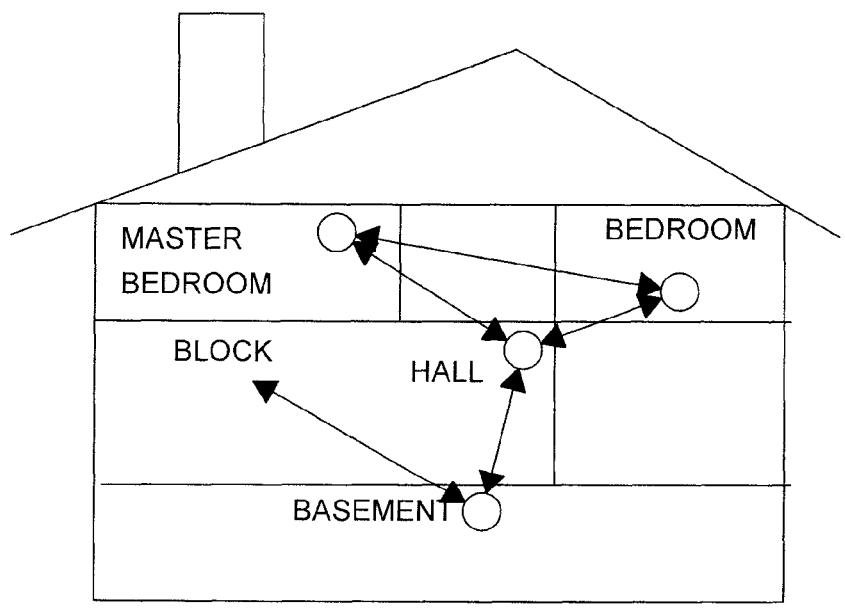

Another embodiment of the present invention is the emergency lighting system which incorporates an occupancy sensor similar to Ultrasonic Occupancy Sensor W-500A, W-1000, W-2000A, and W-2000H as shown in the component design of FIG. 7. In this embodiment, with a closed manual switch, the occupancy sensor has potential and will close its internal contacts and provide continuity to the load and provide light when the sensor detects occupancy. Nonetheless, the emergency lighting system maintains ostensible control over the system; whereupon an alarm state is engaged the emergency lighting system will close its relay contacts in the sequence previously described for FIG. 9B and FIG. 1.

A further embodiment of the present invention is the emergency lighting system, as illustrated in component design FIG. 1. FIG. 6, or FIG. 7, which has been incorporated into a host fixture for an incandescent, fluorescent, LED, or other form of lighting. See FIG. 9A.

Figure 11:
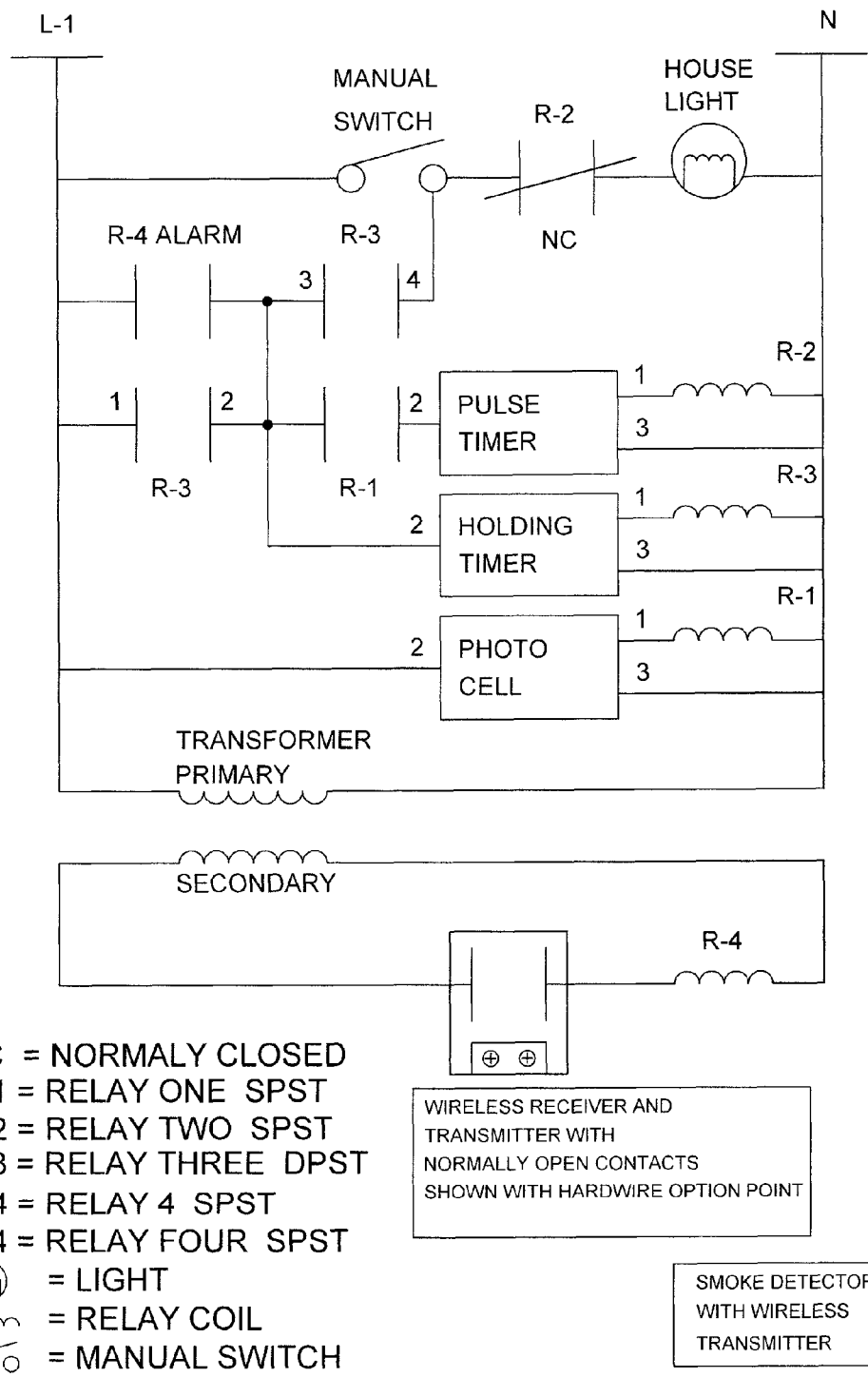
FIG. 11 is a schematic illustration showing the emergency lighting system with a hardwire option in a light present, non-alarm condition.

Another embodiment of the present invention is the emergency lighting system is the wall switch housing in FIG. 10C which incorporates the component design of FIG. 11. The wall switch housing of FIG. 10C is designed to replace a standard wall switch as is commonly found in houses, businesses, and commercial buildings. Once installed it will function as an ordinary wall switch does but with the added benefit and ability of the emergency lighting system as described previously for the FIG. 1 component design and FIG. 9B lamp conversion kit. This component design is virtually identical to that of FIG. 1. The wall switch option as shown in FIG. 10C does not rely solely on wireless technology. The wall switch embodiment can be hardwired into a house alarm system sequence of operation; a smoke detector group; or other similar hardwired alarm systems. The hardwired contact points as well as the wireless transmitter/receiver begin the sequence of operation previously described above for FIG. 1.

We claim:

1. A lighting system comprising:
   a lighting fixture component, wherein said lighting fixture is configured to host at least one lighting element of said lighting system;
   an R-2 switching component, wherein said R-2 switching is configured to cut-off or provide current continuity to said lighting element, in which said R-2 switching comprises at least an R-2 switching line side and R-2 switching load side, and in which said R-2 switching load side is configured to couple to said at least one light fixture;
   a manual switch component, wherein said manual switch is operable to activate said lighting element on and off, and wherein said manual switch comprises at least a manual switch load side coupled to said R-2 switching line side;
   a receiver component, said receiver being configured to receive an emergency or alarm signal from an emergency or alarm transmitter, wherein said lighting system is configured to initiate an alarm state upon receiving said emergency or alarm signal and activate said lighting element;
   a pulse timer component, wherein said pulse timer is configured to activate or de-activate an R-2 energizer component in daylight conditions or there is substantially sufficient amount of ambient light in surrounding areas, in which said activation or de-activation of said R-2 energizer component is substantially sufficient amount of ambient light in surrounding areas, in which said activation or de-activation of said R-2 energizer component is configured to activate or close said R-2 switching component, and in which said activating or de-activating of said R-2 switching component is configured to pulse said lighting element, wherein said pulsed lighting element is operable to substantially provide a visual warning indicator of an emergency condition upon said lighting system initiating an alarm state; and
   a photo cell component, wherein said photo cell is configured to detect said amount of ambient light or daylight conditions, and in which said photo cell is further configured to activate said pulse timer to pulse said lighting element during said lighting system initiating said alarm state and said photo cell detecting a substantially sufficient amount of ambient light or daylight conditions;

the lighting system further comprising a transmitter configured to transmit a second emergency or alarm signal, said second emergency or alarm signal is operable to activate nearby emergency lighting system devices upon said lighting system entering said alarm state;

the lighting system further comprising a holding timer, the holding timer configured to provide current continuity to said lighting element for a predetermined amount of time after termination of said alarm signal; and the lighting system further comprising a normally open contact, wherein the normally open contact is coupled to said transmitter and receiver, and wherein said receipt of said emergency or alarm signal is configured to close said normally open contact and provide current continuity to said holding timer.

2. The lighting system of claim 1, further comprising an R-3 energizer component, said R-3 energizer is configured to be activated when said holding timer is activated, wherein said holding timer is configured to provide power to said R-3 energizer for a predetermined amount of time after said normally open contact reverts back to an open condition.

3. The lighting system of claim 2, wherein said receiver and transmitter comprises a wireless receiver and transmitter, in which said wireless receiver and transmitter is configured to allow said lighting system to receive or transmit said emergency or alarm signal wirelessly from or to other alarm devices.

4. The lighting system of claim 2, wherein said receiver and transmitter comprises a wired receiver and transmitter, in which said wired receiver and transmitter is configured to allow said lighting system to receive or transmit said emergency or alarm signal via wire from or to other alarm devices.

5. The lighting system of claim 2, further comprising a housing assembly, said housing assembly being configured to enclose said components, in which said housing assembly is configured to be incorporated into said lighting fixture.

6. The lighting system of claim 5, in which said housing assembly is generally incorporated into a wall plate light switch configured to be installed on a wall, connected to light(s) and allow normal on/off light switching to occur unless a state of emergency exists.

7. The lighting system of claim 5, in which said housing assembly is configured to be generally screwed into a light bulb receptacle, wherein said housing assembly comprises at least a lighting element receptacle where said lighting element can be generally screwed into.

8. The lighting system of claim 1, further comprising a motion detector, in which said motion detector is configured to generally activate said lighting system when a motion is detected.

9. The lighting system of claim 5, further comprising an occupancy sensor, in which said occupancy sensor is configured to generally activate said lighting system when a motion is detected.

10. A method comprising the steps of;
receiving an alarm condition signal from a smoke detector, wireless alarm device or an emergency lighting system
activating an alarm state, wherein said activating step comprises a step of entering an alarm state upon said receiving step receiving said alarm condition signal;
providing a current continuity path to a lighting element;
detecting an amount of ambient light or daylight condition, wherein said detecting step is initiated upon receiving said alarm condition signal;
supplying a pulsing sequence, said step of supplying a pulsing sequence comprises a step of energizing a pulse timing device, wherein said energizing step is configured to enable and disable said current continuity path when said detecting step detects a substantially sufficient amount of ambient light or daylight condition, and wherein said energizing step is activated during said receiving step receiving said alarm condition signal;
delivering a visual warning indicator of an emergency condition, said delivering step comprises a step of providing a pulsing light, said step of providing a pulsing light is initiated during said lighting system entering an alarm state and said detecting step has detected a substantially sufficient amount of ambient light or daylight condition, in which said pulsing light is operable to provide a visual warning indicator of an emergency condition upon said lighting system entering an alarm state;
closing a normally open contact to provide current continuity to a holding timer upon receiving said alarm condition signal; and
providing current continuity to said lighting element for a predetermined amount of time after termination of said alarm condition signal.

11. The method of claim 10, in which said detecting step further comprises the step of determining a quantity of light in a room.

12. The method of claim 11, wherein said detecting step further comprises the step of energizing said lighting element if said quantity of light in a room is substantially or dark, in which said step of energizing said lighting element is configured to provide light for safe egress from a building or provide a pulse connected light(s) as a visual warning to those in said room.

13. A lighting system comprising;
means for hosting at least one lighting element of said lighting system;
means for providing current continuity to said lighting element;
means for energizing said lighting element;
means for receiving an emergency or alarm signal from an emergency or alarm transmitter, wherein said lighting system is configured to enter an alarm state upon receiving said emergency or alarm signal and activate said lighting element;
means for pulsing said lighting element, wherein said pulsed lighting element is operable to substantially provide a visual warning indicator of an emergency condition upon said lighting system entering an alarm state;
means for detecting an amount of ambient light or daylight conditions, in which said detecting means is configured to activate said pulsing means during said lighting system in said alarm state and said amount ambient light or daylight conditions is a substantially sufficient amount of ambient light or daylight conditions;
means for keeping the lighting system active for a predetermined amount of time; and
means, coupled to said signal receiving means, for providing current continuity to said means for keeping the emergency lighting system active for a predetermined amount of time, upon receipt of said emergency or alarm signal.

14. The method of claim 13, further comprising a means for overriding a current lighting condition of connected lights, wherein said overriding means is configured to take control of said connected lights to provide light or pulse connected lights.

15. The method of claim 14, wherein an expiration of said predetermined amount of time is configured to return said connected lights to a pre-alarm condition.

16. The method of claim 15, further comprising a means for re-transmitting said emergency or alarm signal nearby emergency lighting system devices, said retransmission of said emergency or alarm signal is configured to extend an effective range of said lighting system, wherein a series of daisy-chained emergency lighting system devices is configured to illuminate an entire building helping provide light for a safe exit from said building.

17. The method of claim 13, further comprising a means for detecting motion, wherein said motion detecting means is configured to activate said lighting element when motion is detected.

18. The method of claim 16 which includes a motion detector or occupancy sensor to turn on lights when motion is detected and yet still be subject to override and control by the lighting system should an alarm condition or state of emergency exist.

* * * * *